United States Patent
Kang et al.

(10) Patent No.: US 9,217,419 B2
(45) Date of Patent: Dec. 22, 2015

(54) SYSTEM AND METHOD FOR CONTROLLING VOLTAGE AT POINT OF COMMON COUPLING OF WIND FARM

(71) Applicant: INDUSTRIAL COOPERATION FOUNDATION CHONBUK NATIONAL UNIVERSITY, Jeonju-si, Jeollabuk-do (KR)

(72) Inventors: Yong Cheol Kang, Jeonju-si (KR); Jinho Kim, Jeonju-si (KR); Geon Park, Jeonju-si (KR)

(73) Assignee: INDUSTRIAL COOPERATION FOUNDATION CHONBUK NATIONAL UNIVERSITY, Jeonju-Si, Jeollabuk-Do (KR)

( * ) Notice: Subject to any disclaimer, the term of this patent is extended or adjusted under 35 U.S.C. 154(b) by 0 days.

(21) Appl. No.: 14/590,208

(22) Filed: Jan. 6, 2015

(65) Prior Publication Data

US 2015/0337808 A1 Nov. 26, 2015

(30) Foreign Application Priority Data

May 22, 2014 (KR) .......................... 10-2014-0061454

(51) Int. Cl.
*F03D 9/00* (2006.01)
*F03D 7/00* (2006.01)

(52) U.S. Cl.
CPC . *F03D 9/005* (2013.01); *F03D 7/00* (2013.01)

(58) Field of Classification Search
CPC .......... F03D 7/044; F03D 7/045; F03D 7/048
USPC .................. 290/44, 55; 700/286, 287, 290, 37
See application file for complete search history.

(56) References Cited

U.S. PATENT DOCUMENTS

| 4,251,735 | A | * | 2/1981 | Coleman | 307/46 |
| 5,798,633 | A | * | 8/1998 | Larsen et al. | 323/207 |
| 6,566,764 | B2 | * | 5/2003 | Rebsdorf et al. | 290/44 |

(Continued)

FOREIGN PATENT DOCUMENTS

| JP | 2009-177882 A | 8/2009 |
| JP | 2011-055705 A | 3/2011 |

(Continued)

OTHER PUBLICATIONS

KIPO Office Action for Korean Patent Application No. 10-2014-0061454 which corresponds to the above-identified U.S. application.

*Primary Examiner* — Julio Gonzalez Ramirez
(74) *Attorney, Agent, or Firm* — LRK Patent Law Firm (57) ABSTRACT

A system and method for controlling voltage at a point of common coupling of a wind farm including a plurality of wind turbines is provided. The method includes: calculating a first voltage error value, which is a difference between a reference voltage value of the point of common coupling and an actual voltage value of the point of common coupling; calculating a compensation reference voltage value based on the first voltage error value; calculating a second voltage error value by subtracting a voltage value of an output terminal of a wind turbine from a sum of a reference voltage value of the wind turbine and the compensation reference voltage value; calculating a reactive power compensation value corresponding to the second voltage error value; and injecting a reactive current corresponding to the reactive current compensation value into a power grid.

6 Claims, 10 Drawing Sheets

(56) References Cited

U.S. PATENT DOCUMENTS

| | | | |
|---|---|---|---|
| 6,870,350 B2* | 3/2005 | Garrigan et al. | 322/28 |
| 2003/0015876 A1* | 1/2003 | Ichinose et al. | 290/44 |
| 2009/0146500 A1* | 6/2009 | Jones et al. | 307/82 |
| 2010/0072751 A1* | 3/2010 | Andersen et al. | 290/44 |
| 2011/0049903 A1* | 3/2011 | Jorgensen et al. | 290/55 |

FOREIGN PATENT DOCUMENTS

| | | |
|---|---|---|
| KR | 10-2009-0111968 A | 10/2009 |
| KR | 10-2013-0067675 A | 6/2013 |
| KR | 10-2013-0067683 A | 6/2013 |
| KR | 10-2013-0078680 A | 7/2013 |

* cited by examiner

FIG.1

RELATED ART

FIG. 2A
RELATED ART

Wind farm controller

FIG. 2B
RELATED ART

Wind turbine controller

Wind farm controller

FIG. 4B
RELATED ART

Wind turbine controller

Wind farm controller
FIG. 5A

Wind turbine controller
FIG. 5B

Voltage measured at point of common coupling

FIG. 10B

Reactive power measured at point of common coupling

SYSTEM AND METHOD FOR CONTROLLING VOLTAGE AT POINT OF COMMON COUPLING OF WIND FARM

BACKGROUND OF THE INVENTION

1. Field of the Invention

The present invention relates to a control method for maintaining point of common coupling (PCC) voltage of a wind farm, and more specifically, to a method of promptly recovering PCC voltage by supplying each wind turbine with a portion of reactive power needed for recovering the voltage in proportion to available reactive power when a disturbance such as voltage reduction occurs at a bus close to the point of common coupling.

2. Background of the Related Art

In order to continue stable operation of a power grid, bus voltages of a system should be maintained within an allowed range when a relatively small disturbance such as a load change occurs in the system. In addition, when a relatively big disturbance such as a short circuit fault of a power grid occurs, voltages of the system bus should be promptly recovered within the allowed range after the fault is removed, as well as while the fault lasts. When a voltage of the grid bus goes out of the allowed range by the disturbance, the voltage of the corresponding bus is maintained within the allowed range through reactive power compensation provided by a reactive power compensation device or a synchronous generator located in the neighborhood of the corresponding bus. In the case of a power grid having the high wind penetration, wind turbines in the wind farm should have a capability of supplying reactive power to a point of common coupling to recover voltage at a point connected to the power gird to a rated voltage when a disturbance which invites voltage reduction occurs in the power grid.

Figure 1:
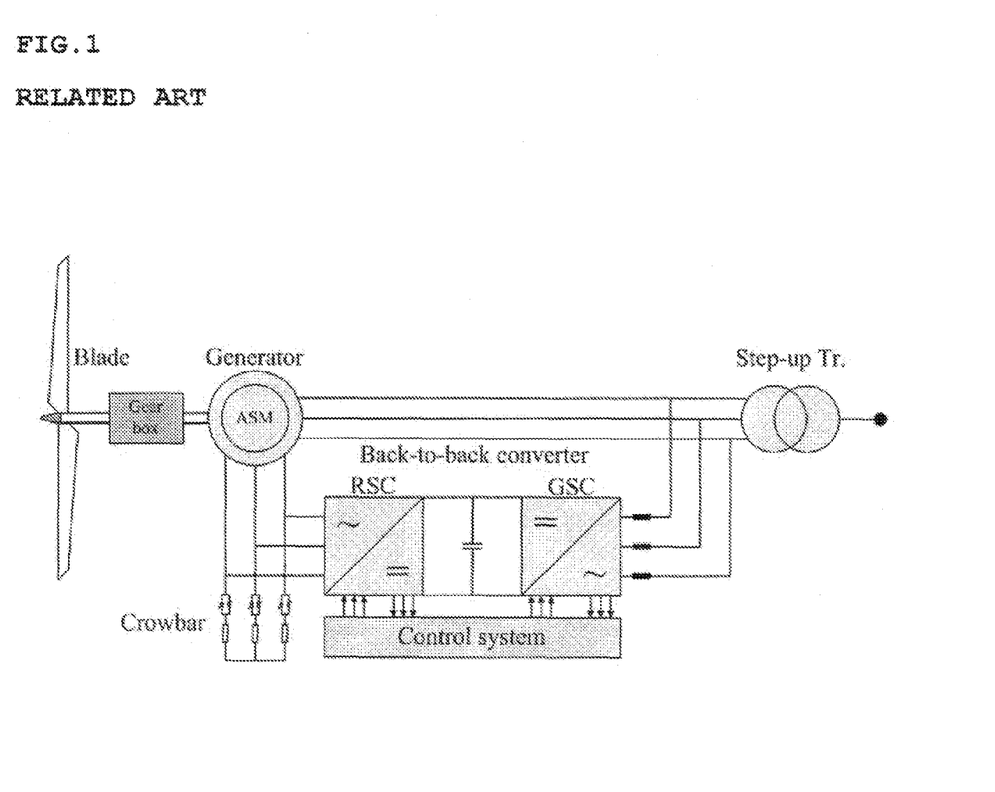
FIG. 1 is a view showing a schematic configuration of a general doubly-fed induction generator.

Currently, since a variable speed wind turbine mainly used for generation of wind power is provided with a converter, it can be used as a reactive power generation source which supplies or consumes reactive power depending on the circumstances of the power grid. A doubly-fed induction generator is provided with a converter. Referring to FIG. 1, the doubly-fed induction generator is provided with a Rotor Side Converter (RSC) and a Grid Side Converter (GSC).

The Rotor Side Converter (RSC) may control active power and reactive power of a stator winding, perform a maximum power point tracking (MPPT) control to maximize active power of the stator, and perform a voltage control function for maintaining a rated voltage at a stator terminal or injecting reactive power into the power grid. On the other, the Grid Side Converter (GSC) is used to control a DC link voltage and may inject reactive power into the power grid when a disturbance occurs in the power grid. In addition, the doubly-fed induction generator may be further provided with a crowbar for short-circuiting rotor windings through a resistor in order to protect converters of the doubly-fed induction generator from over-current generated when a fault occurs in the power grid.

Figure 2A:
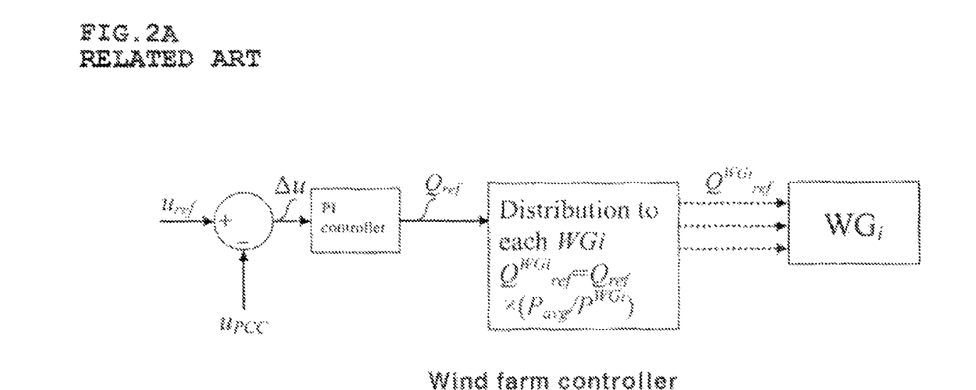
FIGS. 2A and 2B are views schematically showing a voltage control method according to a first convention technique.
Figure 2B:
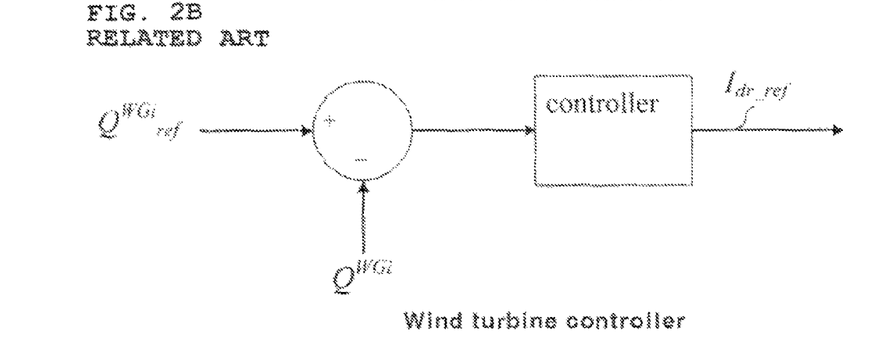

FIGS. 2A and 2B are views schematically showing a voltage control method according to a first convention technique. Referring to FIG. 2A, a wind farm (WPP) controller converts a difference between a voltage $u_{pcc}$ measured at the point of common coupling (PCC) and a reference voltage $u_{ref}$ of the point of common coupling, i.e., a voltage error ($\Delta u$), into a reactive power compensation value $Q_{ref}$ using a Proportional Integral (PI) controller and then calculates a reactive power set value $Q^{WGi}_{ref}$ multiplied by a different weighting factor $\left(\frac{P_{avg}}{P^{WGi}}\right)$ for each wind turbine in the wind farm through the mathematical expression shown below.

$$Q^{WGi}_{ref} = \frac{P_{avg}}{P^{WGi}} \times Q_{ref}$$

Here, i denotes a sequence number of each wind turbine in the wind farm, $P_{avg}$ denotes an average active power for all wind turbines in the wind farm, and $P^{WGi}$ denotes an active power output of the i-th wind turbine. Referring to FIG. 2, a wind turbine (WG) controller finally outputs a reactive current $I_{dr\_ref}$ based on the reactive power set value $Q^{WGi}_{ref}$ received from the WPP controller. However, when the voltage control method of the first conventional technique according to FIG. 2 is utilized, although it is advantageous in that voltage $u_{pcc}$ of the point of common coupling (PCC) can be promptly recovered to the reference voltage $u_{ref}$, there is a problem in that a big overshoot is unavoidable since excessive reactive power more than needed is injected into the power grid when a high weighting factor is multiplied.

Figure 3:
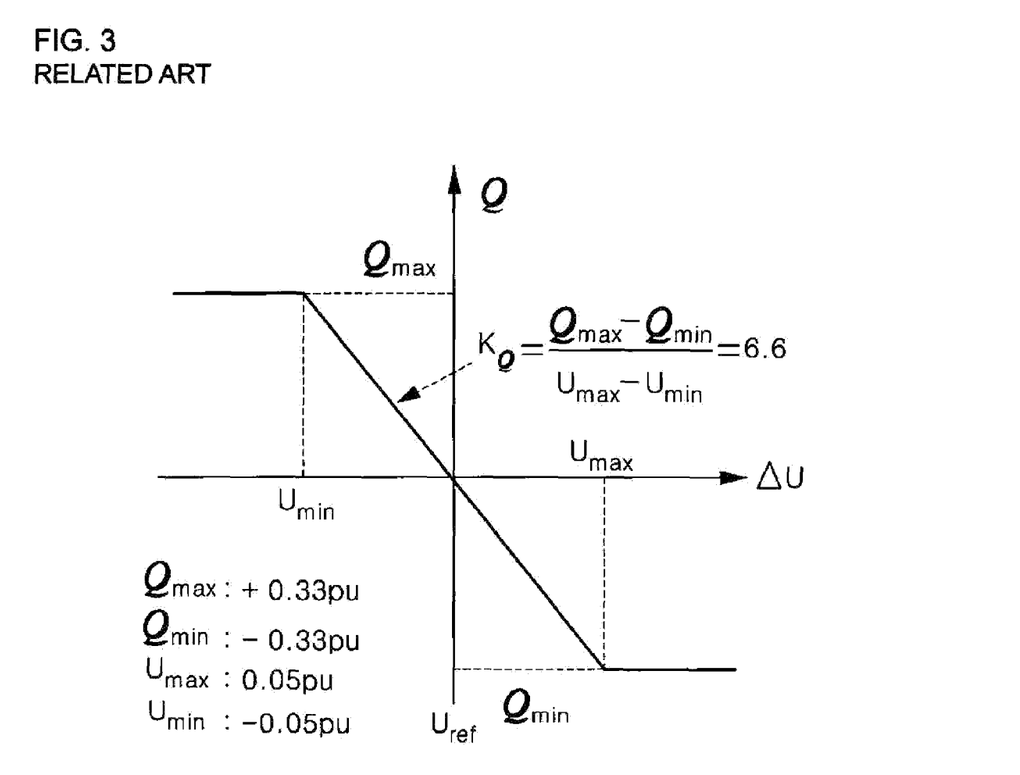
FIG. 3 is a view showing an example of a relation between a reactive power compensation value $Q_{ref}$ and a voltage error $\Delta u$ according to a grid code.

FIG. 3 is a view showing an example of a relation between a voltage error $\Delta u$ and a reactive power compensation value $Q_{ref}$ according to a grid code, and FIG. 4 is a view schematically showing a voltage control method according to a second conventional technique.

Referring to FIG. 3, it can be confirmed that according to the grid code regulating to have a voltage error tolerance of ±5% with respect to the reference voltage value $u_{ref}$ of the point of common coupling and a power factor of 0.95, a control slope having a predetermined slope $k_Q$ of 6.6 is formed by the difference between the 'maximum reactive power of approximately +0.33pu' and the 'minimum reactive power of approximately −0.33pu' in the section of $(-0.05pu) \leq \Delta u \leq (+0.05pu)$ of the voltage error $\Delta u$ with respect to the reference voltage value $u_{ref}$ of the point of common coupling.

Figure 4A:
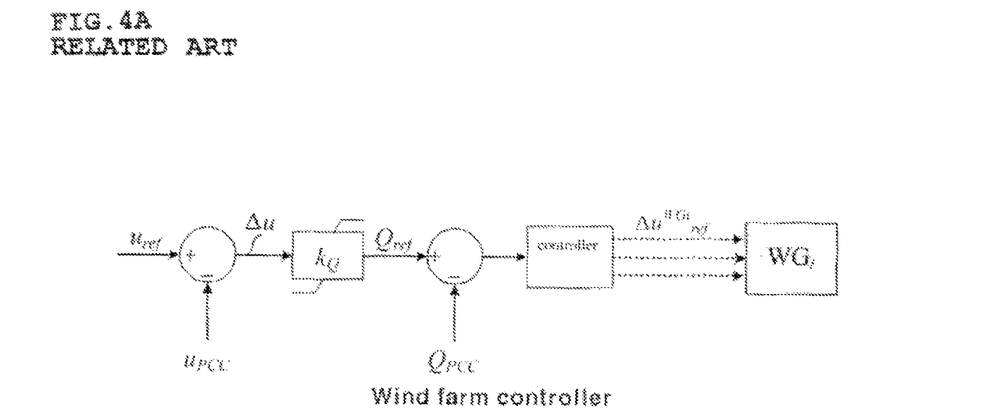
FIGS. 4A and 4B are views schematically showing a voltage control method according to a second conventional technique.

Referring to FIG. 4A, a wind farm controller calculates a reactive power compensation value $Q_{ref}$ by multiplying the difference between the actual measurement voltage $u_{pcc}$ of the point of common coupling (PCC) and the reference voltage value $u_{ref}$ of the point of common coupling, i.e., a voltage error $\Delta u$, and the slope $k_Q$ of the control slope. A reactive power error value $Q_{PCC}$ is calculated by subtracting a reactive power measured at the point of common coupling from the reactive power compensation value, and a compensation reference voltage error value is calculated by proportionally integrating the reactive power error value.

Figure 4B:
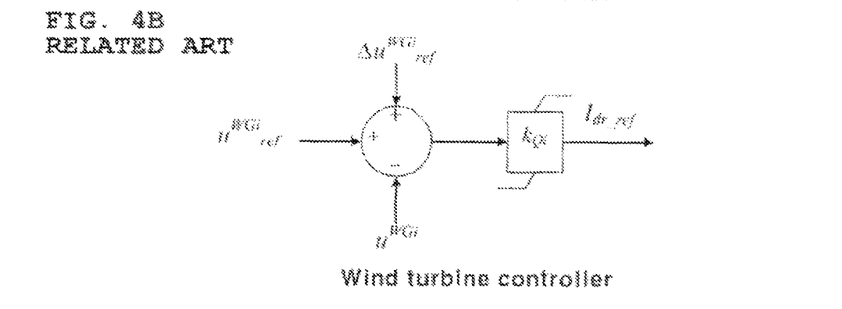

Referring to FIG. 4B, a wind turbine controller calculates a voltage error value by subtracting a voltage value of the output terminal of a wind turbine from a sum of a reference voltage value of the wind turbine and the compensation reference voltage value and calculates a reactive current compensation value $I_{dr\_ref}$ by multiplying the voltage error value and a conversion gain $k_{Qi}$. The conversion gain $k_{Qi}$ multiplied in the process of calculating the reactive current compensation value from the voltage error value may be, for example, 2 and is equally applied to other wind turbines.

However, when the voltage of a point of common coupling is controlled according to a second conventional technique, since a reactive current compensation value $I_{dr\_ref}$ is calculated by equally multiplying only the same slope $k_{Qi}$ as shown in FIG. 4 without considering the active energy of each wind turbine changing by the wind speed or the like with time, there is a limit in that available reactive power changing together with the active power changing according to the wind speed in each wind turbine cannot be sufficiently utilized, and, as a result, there is a problem in that generation of an error in the neighborhood of the reference voltage $u_{ref}$ of the point of common coupling is unavoidable in a steady state after a disturbance.

SUMMARY OF THE INVENTION

Therefore, the present invention has been made in view of the above problems, and it is an object of the present invention to provide a system and method for controlling a voltage value measured at a point of common coupling (PCC) to be promptly recovered by utilizing the available reactive power capability of a wind farm when a disturbance occurs in a power system.

Technical problems to be solved in the present invention are not limited to the technical problems described above, and unmentioned other technical problems may be clearly understood by those skilled in the art from the following descriptions.

To accomplish the above object, according to one aspect of the present invention, there is provided a method of controlling voltage at a point of common coupling of a wind farm including a plurality of wind turbines, the method including the steps of: calculating a first voltage error value, which is a difference between a reference voltage value $u_{ref}$ of the point of common coupling and an actual voltage value $u_{pcc}$ of the point of common coupling, by a first operation unit of a wind farm controller; calculating a compensation reference voltage value based on the first voltage error value, by a first control unit of the wind farm controller; calculating a second voltage error value by subtracting a voltage value of an output terminal of a wind turbine from a sum of a reference voltage value of the wind turbine and the compensation reference voltage value, by a second operation unit of a wind turbine controller; calculating a reactive power compensation value corresponding to the second voltage error value, by a compensation control unit of the wind turbine controller; and injecting a reactive current corresponding to the reactive current compensation value into a power grid, by a converter of the wind turbine.

In addition, the voltage control method may further comprise: calculating a reactive power error value by subtracting a present reactive power of the wind turbine from the reactive power compensation value, by a third operation unit of the wind turbine controller; calculating a reactive current compensation value based on the reactive power error value, by a second control unit of the wind turbine controller; and then injecting a reactive current corresponding to the reactive current compensation value into a power grid, by a converter of the wind turbine In addition, the step of calculating a reactive current compensation value may include dividing the reactive power error value by the voltage value of the output terminal of the wind turbine.

In addition, the wind turbine controller may be separately provided in each of the plurality of wind turbines.

In addition, the step of calculating a reactive power compensation value may include the steps of: measuring a active power injected from the wind turbine into the power grid; acquiring a maximum value and a minimum value of available reactive power corresponding to the measured active power for the wind turbine from an active power-reactive power diagram stored in advance; calculating a conversion gain by substituting the maximum value and the minimum value of the available reactive power in a mathematical expression shown below; and calculating the reactive power compensation value by multiplying the second voltage error value and the conversion gain.

$$k_{Q_i} = \frac{Q_{max}^{WGi} - Q_{min}^{WGi}}{w} \quad \text{[Mathematical expression]}$$

Here, $k_{Q_i}$ denotes a conversion gain, $Q^{WGi}_{max}$ denotes a maximum value of available reactive power, $Q^{WGi}_{min}$ denotes a minimum value of available reactive power, 'i' denotes a sequence number of each wind turbine, and $\omega$ denotes a tolerance preset for a second voltage error value.

In addition, the wind turbine may be a doubly-fed induction generator.

In addition, the wind turbine may be a permanent magnet synchronous generator.

According to another aspect of the present invention, there is provided a system for controlling voltage at a point of common coupling of a wind farm, the system including: a wind farm controller for calculating a first voltage error value, which is a difference between a reference voltage value $u_{ref}$ of the point of common coupling and an actual voltage value $u_{pcc}$ of the point of common coupling, and calculating a compensation reference voltage value based on the first voltage error value; a plurality of wind turbine controllers for calculating a second voltage error value by subtracting a voltage value of an output terminal of a wind turbine from a sum of a reference voltage value of the wind turbine and the compensation reference voltage value, and calculating a reactive power compensation value corresponding to the second voltage error value; and a plurality of wind turbines for injecting a reactive current corresponding to the reactive current compensation value into a power grid, in which the plurality of wind turbine controllers is one-to-one connected to the plurality of wind turbines and individually controls each of the wind turbines.

In addition, each of the wind turbines may measure a active power injected into the power grid, acquire a maximum value and a minimum value of available reactive power corresponding to the measured active power from an avtive power-reactive power diagram stored in advance, calculate a conversion gain by substituting the maximum value and the minimum value of the available reactive power in a mathematical expression described above, and calculate the reactive power compensation value by multiplying the second voltage error value and the conversion gain.

In addition, each of the wind turbines may inject an active power different from those of the other wind turbines into the power grid according to a wind environment, and the wind turbine controller may calculate a reactive power compensation value different from those of the other wind turbine controllers based on the active power of the one-to-one connected wind turbine.

DETAILED DESCRIPTION OF THE PREFERRED EMBODIMENT

The embodiments disclosed in this specification should not be interpreted or used to limit the scope of the present invention. It is natural to those skilled in the art that descriptions including the embodiments of the present invention have a variety of applications. Accordingly, certain embodiments specified in the detailed descriptions of the present invention are merely provided for illustrative purposes for better explanation of the present invention and are not intended to limit the scope of the present invention to the embodiments. In describing the present invention, if already known functions or specific descriptions of constitutions related to the present invention may make the spirit of the present invention unclear, detailed descriptions thereof will be omitted.

Embodiments of the present invention will be hereafter described in more detail with reference to the accompanying drawings.

Figure 5A:
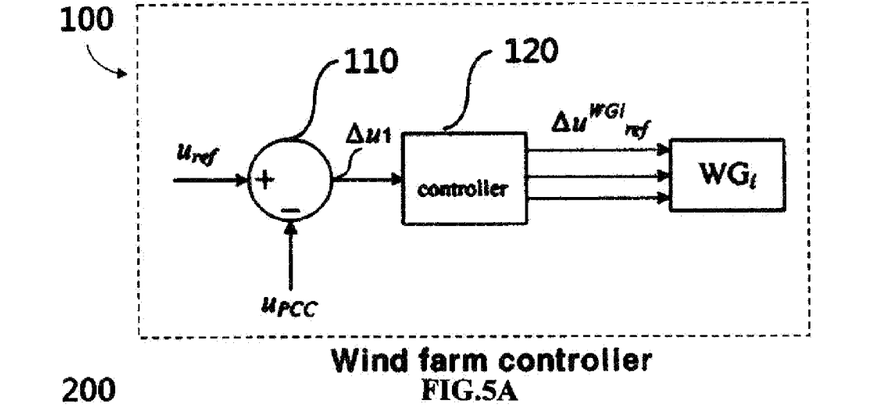
FIGS. 5A and 5B are views schematically showing a system for controlling voltage at a point of common coupling of a wind farm according to an embodiment of the present invention.
Figure 5B:
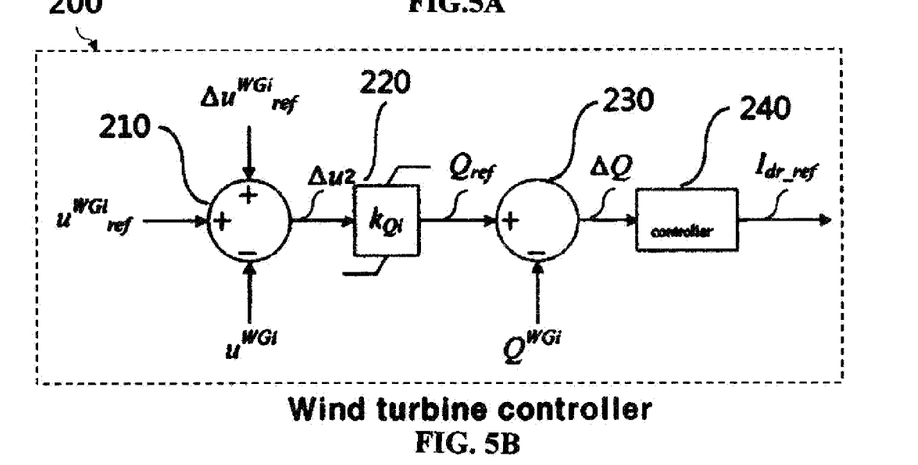
Figure 6:
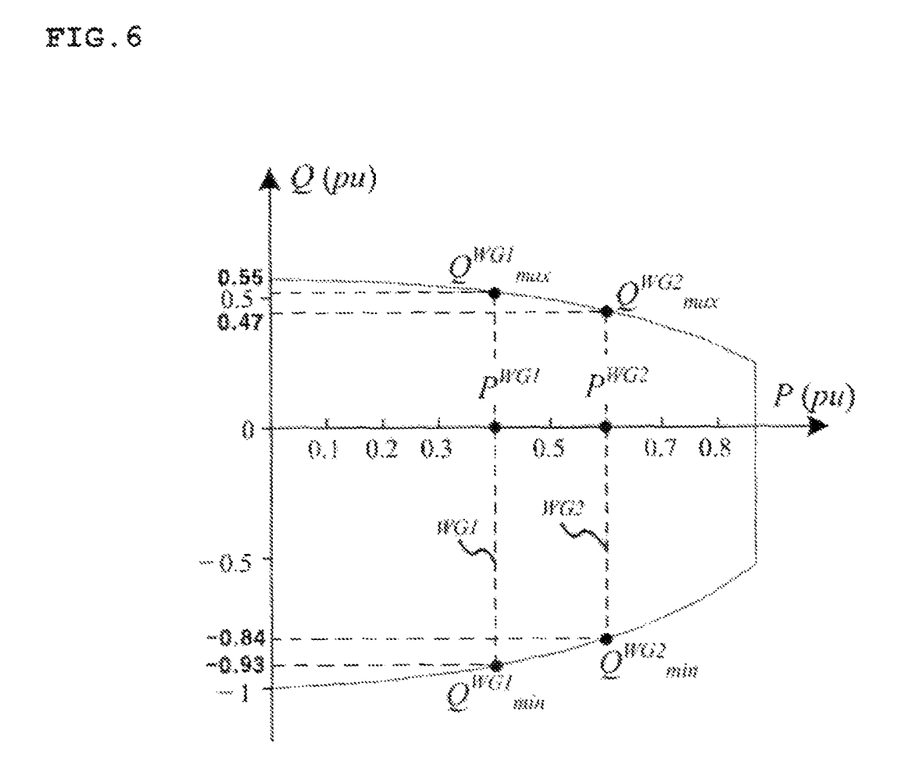
FIG. 6 is a diagram showing a relation between active power and reactive power of each wind turbine according to an embodiment of the present invention.
Figure 7:
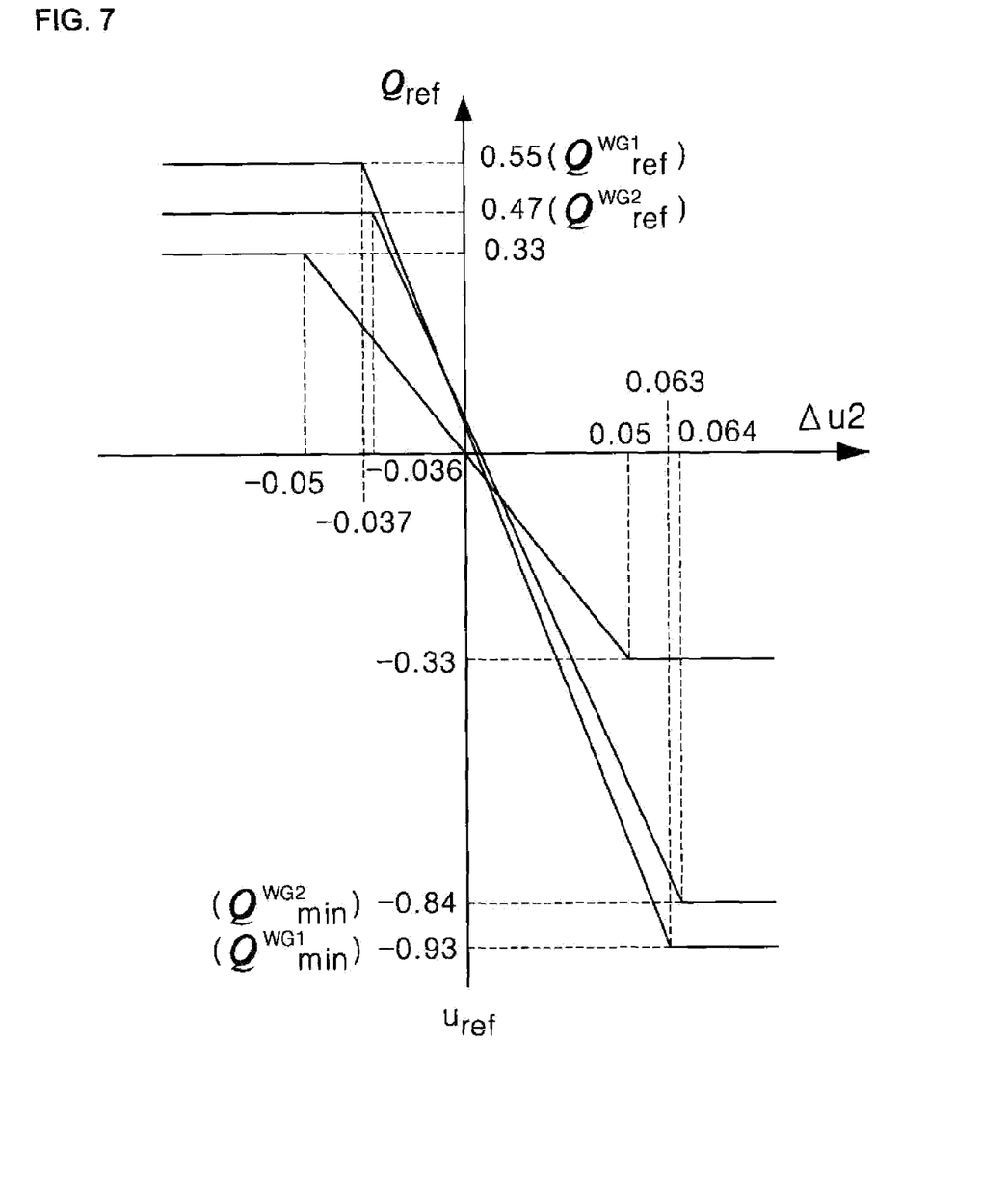
FIG. 7 is a view showing a control slope for calculating a conversion gain by a wind turbine controller according to an embodiment of the present invention.

FIGS. 5A and 5B are views schematically showing a system for controlling voltage at a point of common coupling of a wind farm according to an embodiment of the present invention, FIG. 6 is a diagram showing a relation between active power and reactive power of each wind turbine according to an embodiment of the present invention, and FIG. 7 is a view showing a control slope for calculating a conversion gain by a wind turbine controller according to an embodiment of the present invention.

First, a wind farm controller 100 is a configuration for calculating a first voltage error value $\Delta u_1$, which is a difference between a preset reference voltage value $u_{ref}$ of a point of common coupling and an actual voltage value $u_{pcc}$ of the point of common coupling, and calculating a compensation reference voltage value by controlling (e.g., proportional integration) the calculated first voltage error value $\Delta u_1$. In addition, a wind turbine controller 200 calculates a second voltage error value $\Delta u_2$ by subtracting a voltage value of the output terminal of a wind turbine from a sum of a reference voltage value $u^{WG}_{ref}$ of the wind turbine and the compensation reference voltage value $\Delta u^{WG}_{ref}$ and calculates a reactive power compensation value $Q_{ref}$ corresponding to the second voltage error value $\Delta u_2$. It is a configuration of calculating a reactive power error value $\Delta Q$ by subtracting a present reactive power $Q^{WGi}$ of the wind turbine from the calculated reactive power compensation value $Q_{ref}$ and calculating a reactive current compensation value $I_{dr\_ref}$ based on the calculated reactive power error value $\Delta Q$.

Such a wind turbine controller 200 may individually control each wind turbine 200 based on the compensation reference voltage value $\Delta u^{WG}_{ref}$ transferred from the wind farm controller 100 while being on-to-one connected to each of the wind turbines 10 in the wind farm. Accordingly, each of the wind turbines 10 injects active power changing according to the wind due to the wake effect into the power grid, and the wind turbine controller 200 may calculate a reactive power compensation value different from those of the other wind turbine controllers based on the active power generated by the wind turbine one-to-one connected to the wind turbine controller 200.

Specifically, referring to FIG. 5A, the wind farm controller 100 includes a first operation unit 110 and a first control unit 120. The first operation unit 110 is a configuration for calculating a first voltage error value $\Delta u_1$ by calculating a difference between a preset reference voltage value $u_{ref}$ of a point of common coupling and an actual voltage value $u_{pcc}$ of the point of common coupling for the point of common coupling (PCC).

The first control unit 120 calculates a compensation reference voltage value $\Delta u^{WG}_{ref}$ by performing an integral control, a proportional-integral control or a proportional-integral-derivative control on the first voltage error value $\Delta u_1$ transmitted from the first operation unit 110. Such a compensation reference voltage value $\Delta u^{WG}_{ref}$ is a data equally provided to all the wind turbines in the wind farm to calculate a reactive power compensation value $Q_{ref}$ needed to suppress change of voltage at the point of common coupling (PCC).

Next, referring to FIG. 5B, the wind turbine controller 200 may include a second operation unit 210, a compensation control unit 220, a third operation unit 230, and a second control unit 240. Meanwhile, it should be understood that although the wind turbine controller 200 according to an embodiment of the present invention may be included in the wind turbine 10, in some cases, it may be separately provided outside the wind turbine and operate while being connected to the wind turbine through a wired or wireless network.

The second operation unit 210 calculates a second voltage error value $\Delta u_2$ by subtracting a voltage value $u^{WGi}$ of the output terminal of the wind turbine from a sum $u^{WGi}_{ref} + \Delta u^{WG}_{ref}$ of the reference voltage value $u^{WGi}_{ref}$ of the wind turbine and the compensation reference voltage value $\Delta u^{WG}_{ref}$. Here, the reference voltage value $u^{WGi}_{ref}$ of the wind turbine means a reference value preset for the output terminal of each wind turbine, and the voltage value $u^{WGi}$ of the output terminal of the wind turbine means a voltage value measured at the output terminal of each wind turbine, and 'i' of each parameter means a sequence number of the wind turbine.

Meanwhile, referring to FIG. 6, diagram data stored in advance can be confirmed to acquire a range of available reactive power with respect to active power generated in each wind turbine 10. Specifically, for example, the compensation control unit 220 may acquire a maximum value $Q^{WG1}_{max}$ and a minimum value $Q^{WG1}_{min}$ of available reactive power by applying active power output $p^{WG1}$ of a first wind turbine $WG_1$ measured at a specific time point to the active power-reactive power diagram and may acquire a maximum value $Q^{WG2}_{max}$ and a minimum value $Q^{WG2}_{min}$ of available reactive power with respect to active power output $p^{WG2}$ of a second wind turbine $WG_2$ at the same time point. In this case, for example, as shown in FIG. 6, the maximum value $Q^{WG1}_{max}$ and the minimum value $Q^{WG1}_{min}$ of the available reactive power may be respectively acquired as 0.55pu and −0.93pu for the first wind turbine $WG_1$, and the maximum value $Q^{WG2}_{max}$ and the minimum value $Q^{WG2}_{min}$ of the available reactive power may be respectively acquired as 0.47pu and −0.84pu for the second wind turbine $WG_2$. The compensation control unit 220 may calculate a conversion gain by applying the acquired maximum values and the minimum values to the mathematical expression 1 shown below.

$$k_{Q_i} = \frac{Q^{WGi}_{max} - Q^{WGi}_{min}}{w} \qquad \text{[Mathematical expression 1]}$$

Here, 'i' of the mathematical expression 1 denotes a sequence number of each wind turbine, $k_{Qi}$ denotes a conversion gain, $Q^{WGi}_{max}$ denotes a maximum value of available reactive power, $Q^{WGi}_{min}$ denotes a minimum value of available reactive power, and ω denotes a tolerance preset for a first voltage error value $\Delta u_1$.

For example, when the voltage error tolerance presented in the grid code for the point of common coupling is between (−0.05pu) and (+0.05pu) with respect to the reference voltage value $u_{ref}$, since ω described above is set to 0.1pu, a first conversion gain $k_{Q1}$ is calculated as 14.8, and a second conversion gain $k_{Q2}$ is calculated as 13.1.

The compensation control unit 220 calculates a reactive power compensation value $Q_{ref}$ by multiplying the second voltage error value $\Delta u_2$ in each wind turbine 10 and the conversion gain $k_{Qi}$ acquired through the operation control process described above.

It can be confirmed that the first conversion gain $k_{Q1}$ and the second conversion gain $k_{Q2}$ are larger than 6.6, which is a slope $k_Q$ of the prior art described above with reference to FIG. 4, and accordingly, the embodiment of the present invention may further promptly suppress change of voltage at the point of common coupling compared with the prior art.

The third operation unit 230 calculates a reactive power error value $\Delta Q$ by subtracting a present reactive power $Q^{WGi}$ of the wind turbine from the reactive power compensation value $Q_{ref}$ calculated by the compensation control unit 220. In addition, the second control unit 240 calculates a reactive current compensation value $I_{dr\_ref}$ by performing an integral control, a proportional-integral control or a proportional-integral-derivative control on the reactive power error value $\Delta Q$ calculated by the third operation unit 230.

Figure 8:
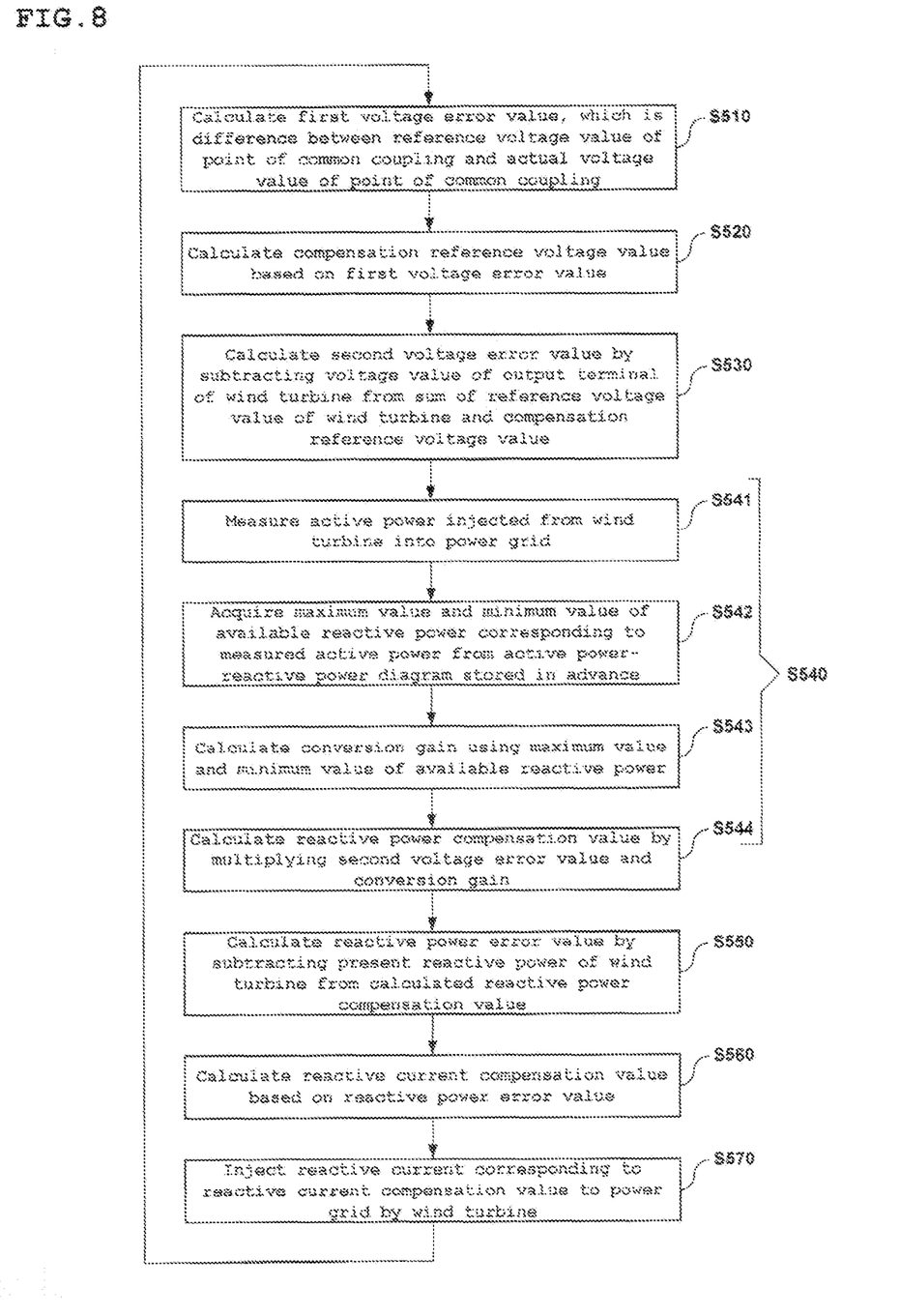
FIG. 8 is a flowchart sequentially showing the steps of a method of controlling voltage at a point of common coupling of a wind farm according to an embodiment of the present invention.

FIG. 8 is a flowchart sequentially showing the steps of a method of controlling voltage at a point of common coupling of a wind farm according to an embodiment of the present invention.

Referring to FIG. 8, in the control method according to the present invention, first, the first operation unit 110 of the wind farm controller 100 calculates a first voltage error value $\Delta u_1$, which is a difference between a reference voltage value $u_{ref}$ of a point of common coupling and an actual voltage value $u_{pcc}$ of the point of common coupling (S510).

Next, the first control unit 120 of the wind farm controller 100 calculates a compensation reference voltage value $\Delta u^{WG}_{ref}$ by performing an integral control, a proportional-integral control or a proportional-integral-derivative control on the first voltage error value $\Delta u_1$ (S520). Such a compensation reference voltage value $\Delta u^{WG}_{ref}$ may be commonly provided for all the wind turbines in the wind farm.

Subsequently, the second operation unit 210 of the first wind turbine controller 200 calculates a second voltage error value $\Delta u_2$ by subtracting a voltage value $u^{WGi}$ of the output terminal of a wind turbine from a sum ($u^{WGi}_{ref} + \Delta u^{WG}_{ref}$) of a reference voltage value $u^{WGi}_{ref}$ of the wind turbine and the compensation reference voltage value $\Delta u^{WG}_{ref}$ (S530).

Next, the compensation control unit 220 of the first wind turbine controller 200 calculates a reactive power compensation value $Q_{ref}$ corresponding to the second voltage error value $\Delta u_2$ (S540). At this point, specifically, the step of calculating a reactive power compensation value $Q_{ref}$ (S540) may include the steps of measuring a active power injected from the wind turbine into the power grid (S541), acquiring a maximum value $Q^{WGi}_{max}$ and a minimum value $Q^{WGi}_{min}$ of available reactive power corresponding to the measured active power for the wind turbine from the active power-reactive power diagram stored in advance (see FIG. 6) (S542), calculating a conversion gain $k_{Qi}$ by substituting the maximum value $Q^{WGi}_{max}$ and the minimum value $Q^{wGi}_{min}$ of the available reactive power in the mathematical expression 1 described above (S543), and calculating a reactive power compensation value $Q_{ref}$ by multiplying the second voltage error value $\Delta u_2$ and the conversion gain $k_{Qi}$ (S544).

Next, the third operation unit 230 of the wind turbine controller 200 calculates a reactive power error value $\Delta Q$ by subtracting a present reactive power $Q^{WGi}$ of the wind turbine from the reactive power compensation value $Q_{ref}$ (S550).

Next, the second control unit 240 of the wind turbine controller 200 calculates a reactive current compensation value $I_{dr\_ref}$ by performing an integral control, a proportional-integral control or a proportional-integral-derivative control on the reactive power error value $\Delta Q$ (S560). Alternatively, the second control unit 240 may also calculate the reactive current compensation value $I_{dr\_ref}$ by dividing the reactive power error value $\Delta Q$ by the voltage value $u^{WGi}$ of the output terminal of the wind turbine.

If the step of calculating a reactive current compensation value (S560) is completed, a process of injecting a reactive current corresponding to the reactive current compensation value $I_{dr\_ref}$ into the power grid is performed by the converter of the wind turbine (S570).

Figure 9:
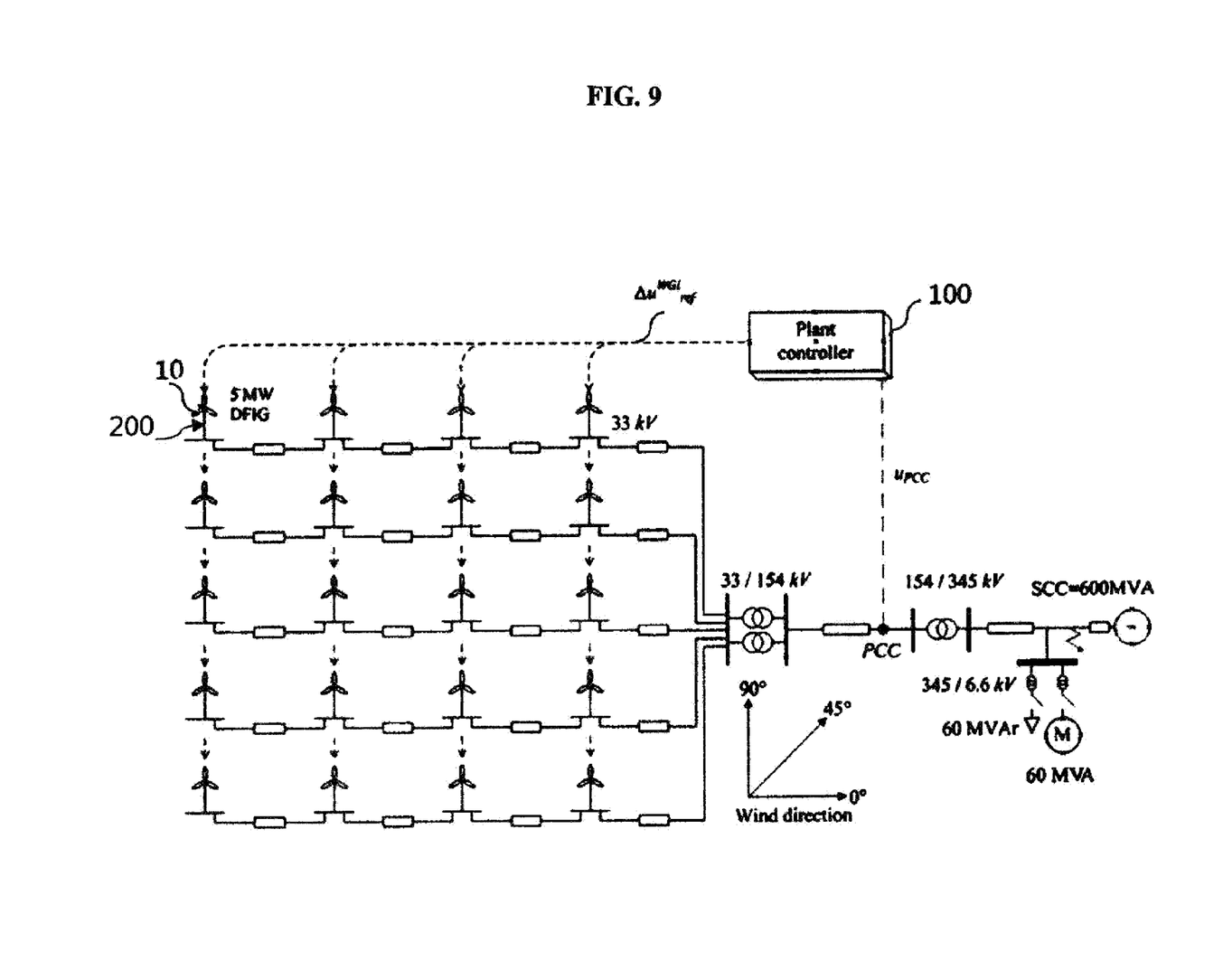
FIG. 9 is a mimetic diagram showing a model of a system including a wind farm and a power grid for simulating an embodiment of the present invention.

FIG. 9 is a mimetic diagram showing a model of a system including a wind farm and a power grid for simulating an embodiment of the present invention, and FIG. 10 is a graph showing a simulation result according to FIG. 9.

First, referring to FIG. 9, a wind farm is configured of total twenty 5 MW-class Doubly-Fed Induction Generators (DFIG). It is possible to confirm a simulation system model in which four Doubly-Fed Induction Generators (DFIG) are connected to a feeder line, five feeder lines are connected to a 33 kV/154 kV transformer of a substation, and the transformer is connected to a point of common coupling (PCC) through a 154 kV submarine cable having a length of 10 Km. In addition, the distance between two adjacent Doubly-Fed Induction Generators (DFIG) is set to 1 Km, and the short circuit ratio of the power grid is set to 6.

Figure 10A:
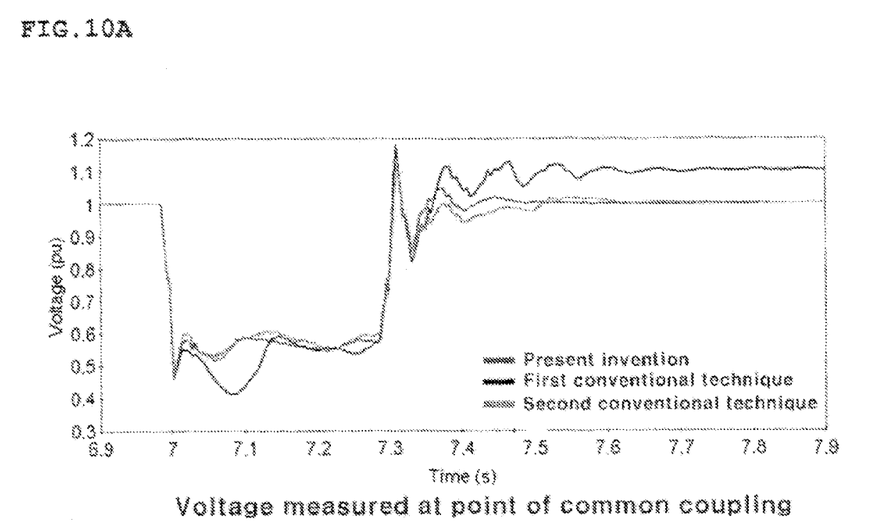
FIGS. 10A and 10B are graphs showing a simulation result according to FIG.
Figure 10B:
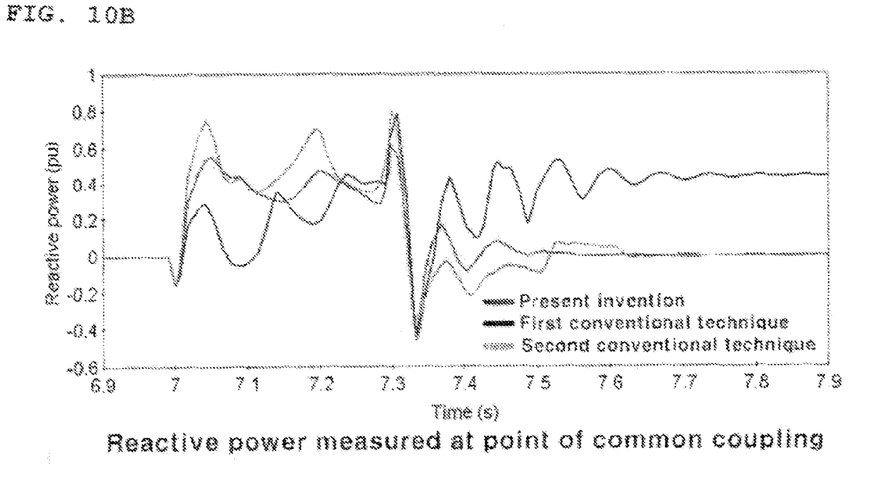

FIGS. 10A and 10B are graphs showing a result testing performance of recovery of voltage $u_{pcc}$ at a point of common coupling by simulating a 3-phase short circuit fault occurring in the power grid for 0.3 seconds from the time point of seven seconds for the simulation model shown in FIG. 9. The compensation reference voltage value $\Delta u^{WG}_{ref}$ transmitted from the wind farm controller 100 to the wind turbine controller 200 has a predetermined cycle (e.g., once per 0.1 seconds). At this point, the wind speed and the wind direction of the wind flowing to the wind farm are respectively to 12 m per second and 0 degrees to take into account the wake effect when the voltage is controlled.

Referring to FIG. 10, the red solid line shows a simulation result for a control method according to the present invention, and the blue line shows a simulation result for the first conventional technique (see FIG. 2), and the green line shows a simulation result for the second conventional technique (see FIG. 4).

Referring to FIG. 10A, it can be confirmed that in all the three control methods, the voltage value $u_{pcc}$ at the point of common coupling is dropped to 0.45pu right after the time point of seven seconds when the 3-phase short circuit fault is applied. In addition, referring to FIG. 10B, right after the time point of fifteen seconds, it can be confirmed that the control methods according to an embodiment of the present invention and the second conventional technique provide more reactive power to the power grid compared with the control method according to the first conventional technique. Such a result is acquired since the wind turbine uses the first conventional technique which uses a reactive power control mode unlike the present invention and the second conventional technique in which the wind turbine uses a voltage control mode.

On the other hand, referring to FIG. 10A for the result of the voltage after 7.3 seconds, it can be confirmed that the first conventional technique requires a further longer time than the present invention and the second conventional technique to recover the voltage at the point of common coupling to the reference voltage value $u_{ref}$ of the point of common coupling, and this is since that a weighting factor (see FIG. 2) depending on the active power has a value larger than needed. In addition, it can be confirmed that the embodiment of the present invention more promptly recover the voltage to the reference voltage value $u_{ref}$ of the point of common coupling compared with the first conventional technique or the second conventional technique.

According to an embodiment of the present invention, there is provided a system and method for controlling to a voltage value measured at the point of common coupling (PCC) to be promptly recovered when the voltage does not satisfy a reference voltage due to a disturbance generated in a power grid.

In addition, the voltage measured at the point of common coupling can be adaptively controlled although the operation condition of a wind farm changes according to the change of wind, by acquiring a maximum value and a minimum value of available reactive power which depends on the active power changing according to the wind and adjusting the magnitude of the control slope of the wind turbine controller.

In addition, all the wind turbines in the wind farm can be independently controlled by using a single voltage value measured at the point of common coupling (PCC). Specifically, wind turbines included in a large-scale wind farm produce active power different from those of the others due to the wake effect, and the reactive power available in each of the wind turbines is different from those of the others as a result, and according to the present invention, it may be controlled to compensate the reactive power different in each wind turbine.

Since the term "include" or the like specified above means inclusion of a corresponding constitutional element as far as an opposed description is not specially specified, it should be interpreted as not excluding another constitutional element, but further including another constitutional element.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of controlling voltage at a point of common coupling of a wind farm including a plurality of wind turbines, the method comprising the steps of:

calculating a first voltage error value ($\Delta u1$), which is a difference between a reference voltage value $u_{ref}$ of the point of common coupling and an actual voltage value ($u_{pcc}$) of the point of common coupling, by a first operation unit (110) of a wind farm controller;

calculating a compensation reference voltage value ($\Delta u^{WGi}_{ref}$) based on the first voltage error value ($\Delta u1$), by a first control unit of the wind farm controller (120);

calculating a second voltage error value ($\Delta u2$) by subtracting a voltage value ($u^{WGi}$) of an output terminal of a wind turbine from a sum ($u^{WGi}_{ref}+\Delta u^{WGi}_{ref}$) of a reference voltage value ($u^{WGi}_{ref}$) of the wind turbine and the compensation reference voltage value ($\Delta u^{WGi}_{ref}$), by a second operation unit (210) of a wind turbine controller;

calculating a reactive power compensation value ($Q_{ref}$) corresponding to the second voltage error value ($\Delta u2$), by a compensation control unit (220) of the wind turbine controller;

calculating a reactive power error value ($\Delta Q$) by subtracting a present reactive power ($Q^{WGi}$) of the wind turbine from the reactive power compensation value ($Q_{ref}$), by a third operation unit (230) of the wind turbine controller;

calculating a reactive current compensation value ($I_{dr\_ref}$) based on the reactive power error value ($\Delta Q$), by a second control unit (240) of the wind turbine controller; and injecting a reactive current corresponding to the reactive current compensation value ($I_{dr\_ref}$) into a power grid, by a converter of the wind turbine, wherein the step of calculating a reactive current compensation value includes dividing the reactive power error value by the voltage value of the output terminal of the wind turbine.

2. The method according to claim 1, wherein the wind turbine controller is separately provided in each of the plurality of wind turbines.

3. The method according to claim 1, wherein the step of calculating a reactive power compensation value includes the steps of:

measuring a active power injected from the wind turbine into the power grid;

acquiring a maximum value and a minimum value of available reactive power corresponding to the measured active power from an stored active power-reactive power diagram for the wind turbine;

calculating a conversion gain by substituting the maximum value and the minimum value of the available reactive power in mathematical expression 1; and calculating the reactive power compensation value by multiplying the second voltage error value and the conversion gain, $$k_{Q_i} = \frac{Q^{WGi}_{max} - Q^{WGi}_{min}}{w} \qquad \text{[Mathematical expression 1]}$$

wherein, $k_{Q_i}$ denotes a conversion gain, $Q^{wGi}_{max}$ denotes a maximum value of available reactive power, $Q^{WGi}_{min}$ denotes a minimum value of available reactive power, 'i' denotes a sequence number of each wind turbine, and $\omega$ denotes a tolerance preset for a second voltage error value.

4. The method according to claim 1, wherein the wind turbine is a doubly-fed induction generator.

5. The method according to claim 1, wherein the wind turbine is a permanent magnet synchronous generator.

6. A system for controlling voltage at a point of common coupling of a wind farm, the system comprising:

a wind farm controller for calculating a first voltage error value ($\Delta u1$), which is a difference between a reference voltage value $u_{ref}$ of the point of common coupling and an actual voltage value ($u_{pcc}$) of the point of common coupling, and calculating a compensation reference voltage value ($\Delta u^{WGi}_{ref}$) based on the first voltage error value ($\Delta u1$);

each controller of a plurality of wind turbines for calculating a second voltage error value ($\Delta u2$) by subtracting a voltage value ($u^{WGi}$) of an output terminal of a wind turbine from a sum ($u^{WGi}_{ref}+\Delta u^{WGi}_{ref}$) of a reference voltage value ($u^{WGi}_{ref}$) of the wind turbine and the compensation reference voltage value ($\Delta u^{WGi}_{ref}$), calculating a reactive power compensation value ($Q_{ref}$) corresponding to the second voltage error value ($\Delta u2$), calculating a reactive power error value ($\Delta Q$) by subtracting a present reactive power ($Q^{WGi}$) of the wind turbine from the reactive power compensation value ($Q_{ref}$), and calculating a reactive current compensation value ($I_{dr\_ref}$) based on the reactive power error value ($\Delta Q$); and a plurality of wind turbines for injecting a reactive current corresponding to the reactive current compensation value into a power grid, wherein the plurality of wind turbine controllers is one-to-one connected to the plurality of wind turbines and individually controls each of the wind turbines, wherein each of the wind turbines measures an active power injected into the power grid, acquires a maximum value and a minimum value of available reactive power corresponding to the measured active power from an active power-reactive power diagram stored in advance, calculates a conversion gain by substituting the maximum value and the minimum value of the available reactive power in mathematical expression 2, and calculates the reactive power compensation value by multiplying the second voltage error value and the conversion gain, $$k_{Q_i} = \frac{Q^{WGi}_{max} - Q^{WGi}_{min}}{w} \quad \text{[Mathematical expression 2]}$$

wherein, $k_{Q_i}$ denotes a conversion gain, $Q^{WGi}_{max}$ denotes a maximum value of available reactive power, $Q^{WGi}_{min}$ denotes a minimum value of available reactive power, 'i' denotes a sequence number of each wind turbine, $\omega$ denotes a tolerance preset for a first voltage error value, and wherein each of the wind turbines injects an active power different from other wind turbines, which are within the same wind farm, into the power grid according to a wind environment, and the wind turbine controller calculates a reactive power compensation value different from other wind turbine controllers based on the active power of the one-to-one connected wind turbine.

\* \* \* \* \*